(12) United States Patent
Wang et al.

(10) Patent No.: US 10,452,882 B2
(45) Date of Patent: Oct. 22, 2019

(54) BARCODE READING DEVICE

(71) Applicant: CHAMPTEK INCORPORATED, New Taipei (TW)

(72) Inventors: Kuo-Chun Wang, New Taipei (TW); Shu-Ying Huang, New Taipei (TW)

(73) Assignee: CHAMPTEK INCORPORATED, New Taipei (TW)

( * ) Notice: Subject to any disclaimer, the term of this patent is extended or adjusted under 35 U.S.C. 154(b) by 69 days.

(21) Appl. No.: 15/871,005

(22) Filed: Jan. 14, 2018

(65) Prior Publication Data

US 2019/0130141 A1    May 2, 2019

(30) Foreign Application Priority Data

Oct. 30, 2017 (TW) .............................. 106215995 U

(51) Int. Cl.
*G06K 7/10* (2006.01)

(52) U.S. Cl.
CPC ....... *G06K 7/1096* (2013.01); *G06K 7/10554* (2013.01); *G06K 7/10613* (2013.01); *G06K 7/10673* (2013.01); *G06K 7/10831* (2013.01); *G06K 7/10861* (2013.01)

(58) Field of Classification Search
CPC ............................. G06K 7/096; G06K 7/0095
USPC ................................. 235/462.39, 462.32, 454
See application file for complete search history.

(56) References Cited

U.S. PATENT DOCUMENTS

| | | | |
|---|---|---|---|
| 6,262,366 B1* | 7/2001 | Ichikawa | H05K 5/0013 174/50 |
| 7,546,953 B1 | 6/2009 | Collins, Jr. | |
| 2001/0042789 A1 | 11/2001 | Krichever et al. | |
| 2003/0085284 A1* | 5/2003 | Bremer | G06K 7/10554 235/462.32 |
| 2007/0051812 A1 | 3/2007 | Lopez et al. | |
| 2007/0095919 A1 | 5/2007 | Detwiler et al. | |
| 2009/0001171 A1 | 1/2009 | Carlson et al. | |
| 2011/0309147 A1 | 12/2011 | Barkan et al. | |
| 2012/0018516 A1* | 1/2012 | Gao | G06K 7/10722 235/454 |
| 2013/0075471 A1 | 3/2013 | Collins, Jr. | |
| 2014/0061291 A1 | 3/2014 | Madej | |
| 2014/0286550 A1* | 9/2014 | Beule | G01N 21/8483 382/128 |
| 2016/0034722 A1* | 2/2016 | Joseph | G06K 7/0095 235/438 |
| 2017/0011243 A1 | 1/2017 | Hammer | |

(Continued)

OTHER PUBLICATIONS

Search Report dated Aug. 23, 2018 of the corresponding European patent application.

*Primary Examiner* — Allyson N Trail

(74) *Attorney, Agent, or Firm* — Chun-Ming Shih; HDLS IPR Services

(57) ABSTRACT

A barcode reading device (1, 1a, 1b, 1c, 1d) includes a polygon housing (10, 10a, 10b) and a plurality of barcode reading units (32, 34, 34_1, 34_2); a first window (12) is formed on one surface of the polygon housing (10, 10a, 10b) and a second window (14) is formed of another surface thereof; the barcode reading units (32, 34, 34_1, 34_2) are housed within an accommodating space of the polygon housing (10, 10a, 10b). One of the barcode reading units (32, 34, 34_1, 34_2) reads barcode through the second window (14), and the other barcode reading units (32, 34, 34_1, 34_2) read barcode through the first window (12).

11 Claims, 9 Drawing Sheets

(56) References Cited

U.S. PATENT DOCUMENTS

2017/0054967 A1 2/2017 Zhang et al.
2017/0345046 A1* 11/2017 Raju .................. G06Q 30/0238

* cited by examiner

BARCODE READING DEVICE

BACKGROUND

Technical Field

The present disclosure relates to barcode readers. More particularly, the present disclosure relates to barcode reading devices capable of reading one-dimensional and two-dimensional barcodes.

Description of Related Art

There are two general classes of barcodes: one-dimensional (1D or linear) and two-dimensional (2D). Linear or 1D barcodes, like the UPC code commonly found on consumer goods, use a series of variable-width lines and spaces to encode data. If you scan a UPC code, for instance, the characters in the barcode have to relate to an item in a pricing database to be useful.

2D barcodes, like QR Code, use patterns of squares, hexagons, dots, and other shapes to encode data. They can be much smaller while holding more data than 1D codes. A 2D barcode doesn't just encode alphanumeric information. These codes can also contain images, website addresses, voice, and other types of binary data.

1D barcodes can be scanned with traditional laser scanners, or using camera-based imaging scanners. 2D barcodes, on the other hand, can only be read using imagers. As such, the checkout station usually places a 1D barcode scanner and a 2D barcode scanner for respectively scanning 1D barcodes and 2D barcodes, which causes cables thereof being tangled, large power consumption, and occupies large space.

In addition, when the clerk assists by scanning each of 1D barcodes of customer's checkout items, the consumer may give the mobile coupons to the clerk for discounting; however, the mobile coupons are usually loaded on the mobile device, such as smart phone. As such, the mobile device for showing the mobile coupons may drop while the consumer hands over his/her mobile device to the clerk.

SUMMARY

To arraign the above objective, the present disclosure provided a barcode reading device capable of reading barcodes disposed at different directions (and with different encoding schemes).

According to one aspect of the present disclosure, a barcode reading device includes a polygon housing and a plurality of barcode reading units; the polygon housing is formed with an accommodating space, a first window, and a second window; specifically, the first window is formed on one of the surfaces of the polygon housing, and the second window is formed on another surface of the polygon housing. The barcode reading units are housed within the accommodating space of the polygon housing; one of the barcode reading units reads a barcode through the second window, and the other barcode reading units read a barcode through the first window.

The barcode reading device of the present disclosure makes multiple barcode reading units be disposed on different surface of the polygon housing, so that the checkout counter and the customer may respectively scan barcodes in different barcode reading units, so that the transaction time can be shortened and solve the problem mentioned in the related art.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
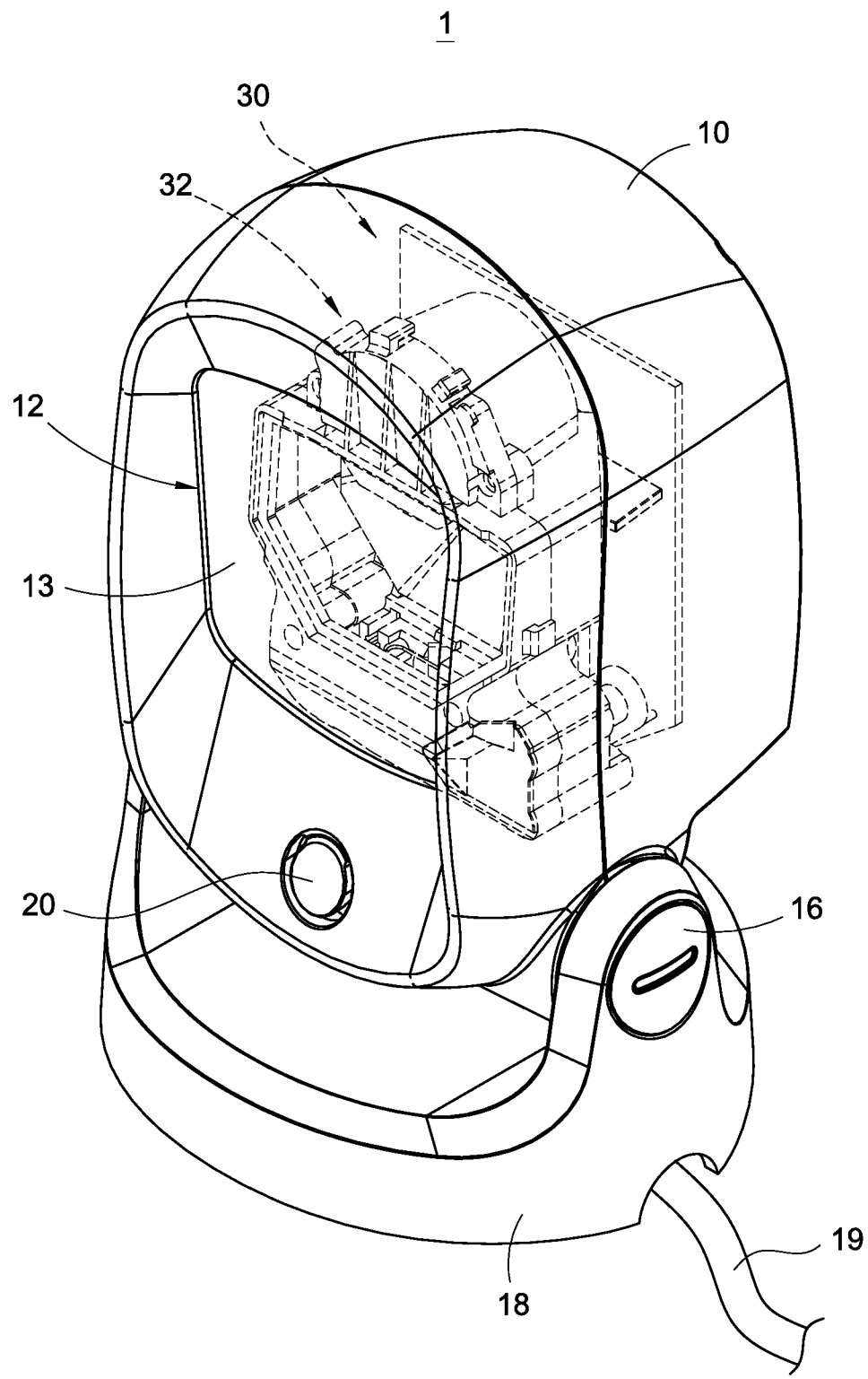
FIG. 1 is a perspective view of a barcode reading device in accordance with a 1st embodiment of the present disclosure.
Figure 2:
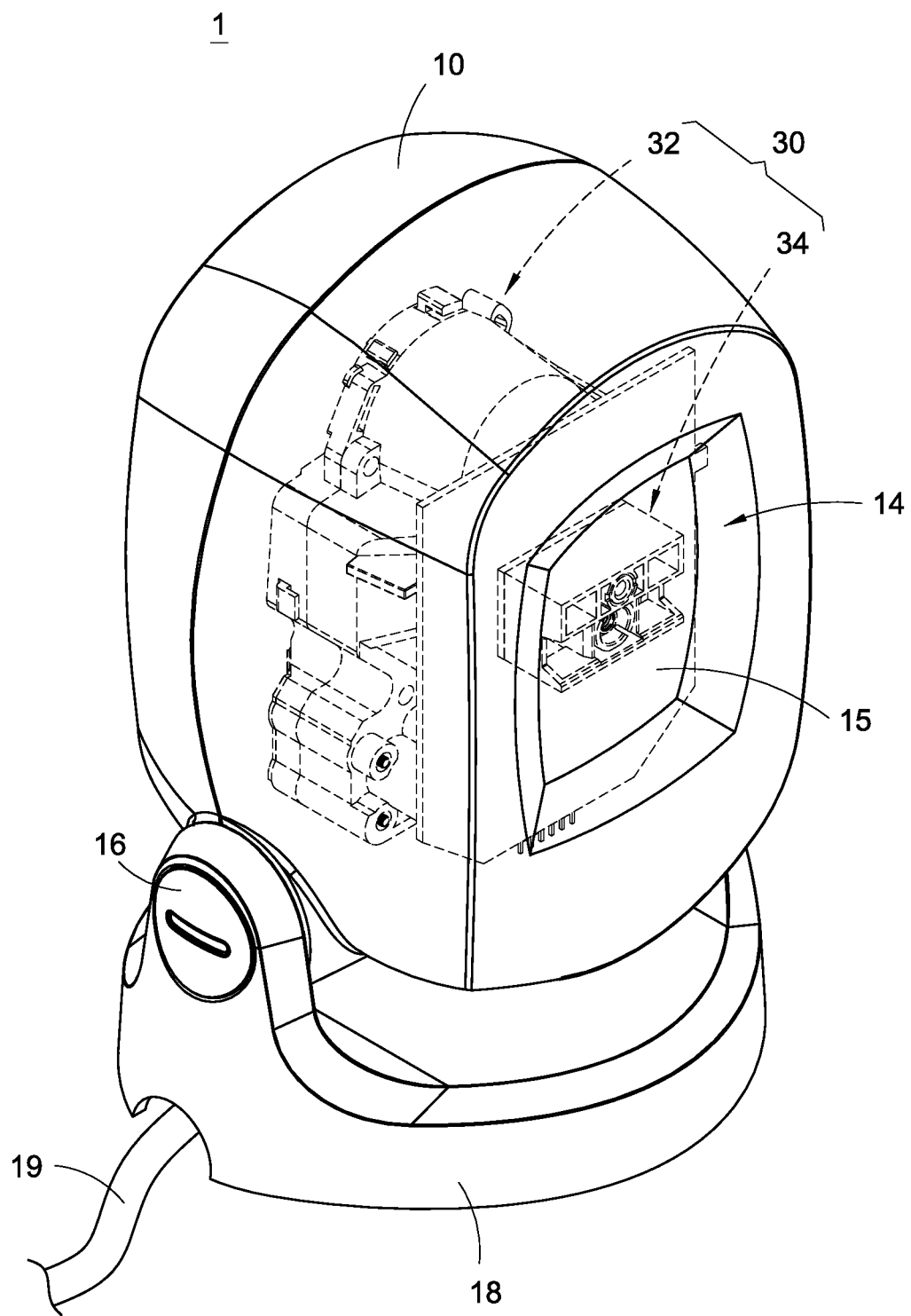
FIG. 2 is another perspective view of the barcode reading device in accordance with the 1st embodiment of the present disclosure.

FIG. 1 and FIG. 2 are perspective views of a barcode reading device in accordance with a 1st embodiment of the present disclosure. In FIG. 1 and FIG. 2, the barcode reading device 1 includes a polygon housing 10 and a barcode reading module 30; the polygon housing 10 formed with an accommodating space, a first window 12, and a second window 14; the first window 12 and the second window 14 communicating with the accommodating space are formed on different surfaces of the polygon housing 10. More particularly, the first window 12 is formed on one of the surfaces of the polygon housing 10, and the second window 14 is formed on another surface of the polygon housing 10. In this embodiment, the polygon housing 10 is substantially a rectangular housing, and the first window 12 and the second window are formed on two opposite surfaces in the longitudinal direction of the polygon housing 10.

The barcode reading module 30 is housed within the polygon housing 10 and includes a first barcode reading unit 32 and a second barcode reading unit 34. The first barcode reading unit 32 is arranged adjacent to the first window 12 for reading 1D barcode, such as universal product code (UPC) type barcode. The second barcode reading unit 34 is arranged adjacent to the second window 14 for reading 1D or 2D barcode.

Figure 3:
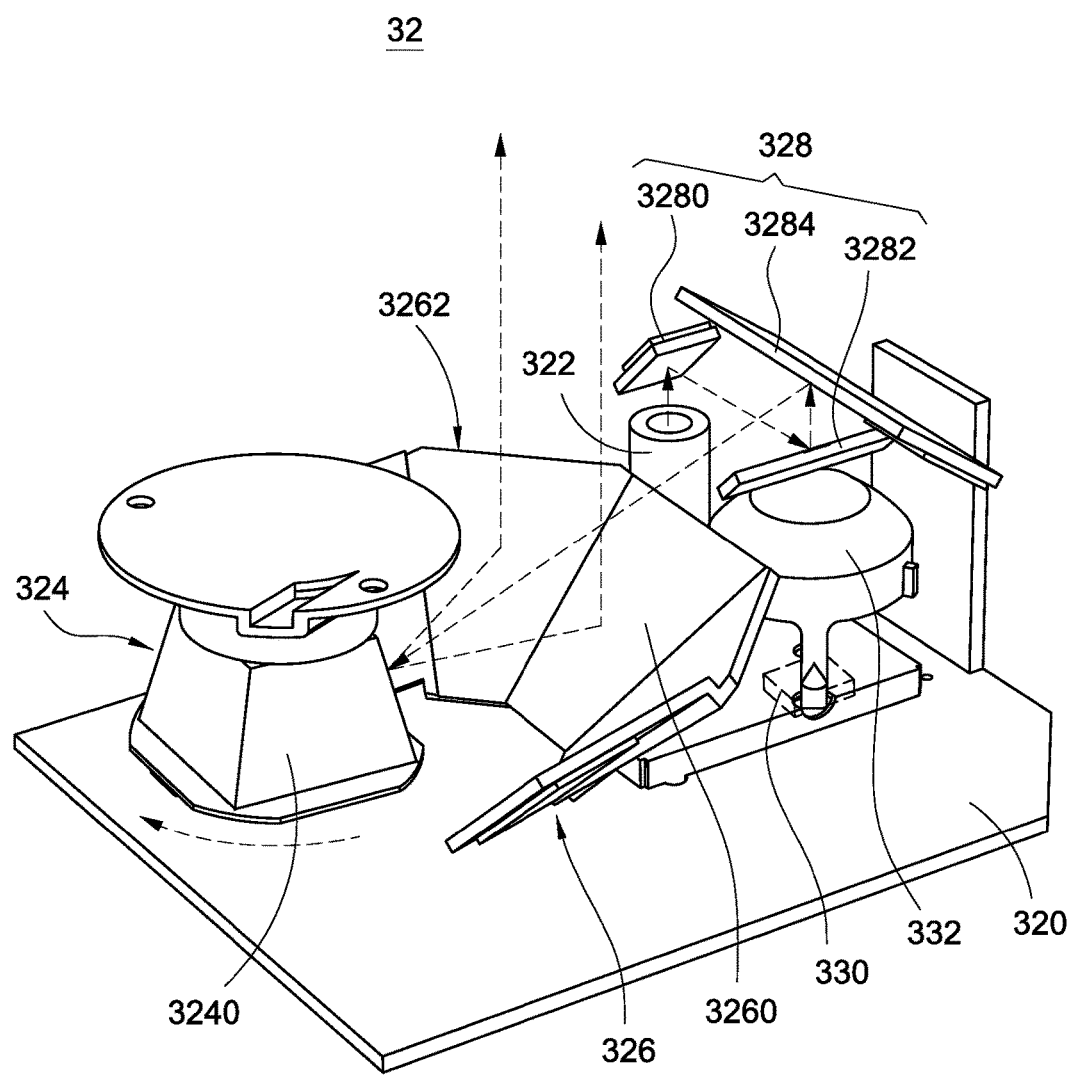
FIG. 3 is a perspective view of a first barcode reading unit in accordance with the 1st embodiment of the present disclosure.
Figure 4:
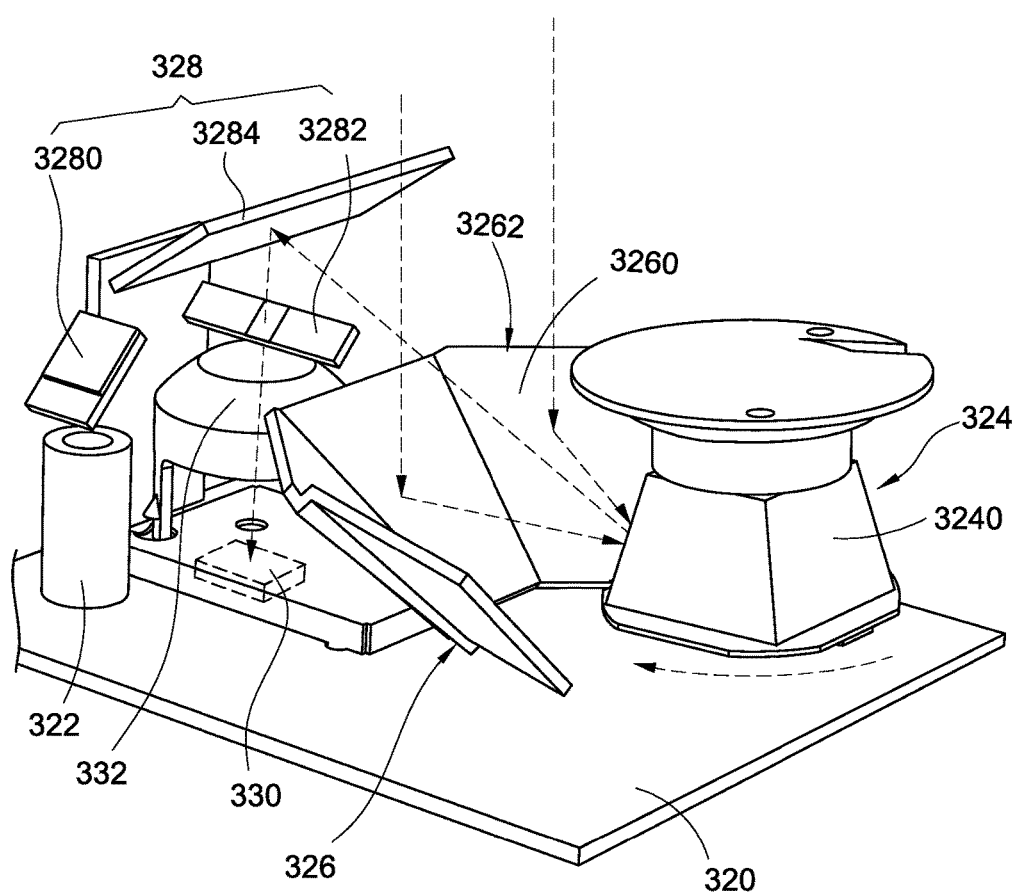
FIG. 4 is another perspective view of the first barcode reading unit in accordance with the 1st embodiment of the present disclosure.

FIG. 3 and FIG. 4 are perspective views of a first barcode reading unit in accordance with the 1st embodiment of the present disclosure. In FIG. 3 and FIG. 4, the first barcode reading unit 32 includes a carrier board 320, a laser diode 322, a rotary mirror spinner 324, a fixed reflecting mirror assembly 326, a light deflecting assembly 328, a linear sensor 330, and a converging lens 332.

The carrier board 320 is, for example, a printed circuit board and circuit foils are placed thereon. The carrier board 320 is provided for carrying the laser diode 322, the rotary mirror spinner 324, the fixed reflecting mirror assembly 326, the linear sensor 330, and the converging lens 332 and transmitting electricity to the laser diode 322, a motor (not shown) of the rotary mirror spinner 324, and the linear sensor 330.

The laser diode 322 mounted on the carrier board 320 emits a laser beam as a light beam, which is provided for reading 1d barcode. In this embodiment, an optical axis of the laser diode 322 is parallel to the normal of the carrier board 320.

The rotary mirror spinner 324 is placed on the carrier board 320 and connected to the motor so as to rotate in a predetermined direction (for example, clockwise direction). In this embodiment, the rotary mirror spinner 324 includes four reflective surfaces 3240, and the normal of each reflective surface 3240 is not perpendicular to that of the carrier board 320. In addition, the width of each reflective surface 3240 gradually decreases from the carrier board 320, such that a square-based-frusto-conical. In the practical application, the rotary mirror spinner 324 may be a polygonal frusto-conical constituted by three or more reflective surfaces.

The fixed reflecting mirror assembly 326 is arranged between the rotary mirror spinner 324 and the light deflecting assembly 328. The fixed reflecting mirror assembly 326 includes a plurality of mirrors 3260 arranged in a U-shaped manner and having an opening 3262; the opening 3262 is toward the rotary mirror spinner 3240. The normal of each mirror 3260 is not perpendicular to that of the carrier board 320 (i.e., the mirrors 3260 are obliquely mounted on the carrier board 320), and the width of each mirror 3260 gradually increases from the carrier board 320. In addition, the distance between the rotary mirror spinner 324 and the projection of the bottom of each mirror 3260 (the portion close to the carrier board 320) onto the carrier board 320 is shorten than the distance between the rotary mirror spinner 324 and the projection of the top of each mirror 3260 (the portion far away from the carrier board 320) onto the carrier board 320.

The linear sensor 330 is mount on the carrier board 320 and its optical axis is parallel to the normal of the carrier board 320. The converging lens 332 is disposed above the linear sensor 330 for focusing the image beam at the linear sensor 330.

The light deflecting assembly 328 includes a first reflective mirror 3282, a beam splitter 3282, and a second reflective mirror 3284, which are obliquely arranged for reflecting/transmitting the laser beam and the image beam. In this embodiment, the first reflective mirror 3280 is disposed above the laser diode 322 for reflecting the laser beam provided by the laser diode 322 to make the laser beam travel to the beam splitter 3282. The beam splitter 3282 is disposed above the linear sensor 33 and the converging lens 332 is arranged between the beam splitter 3282 and the linear sensor 330; the beam splitter 3282 reflects the laser beam and transmits the image beam. The second reflective mirror 3284 is disposed in the reflecting route of the beam splitter 3282; the second reflective mirror 3282 reflects laser beam from the beam splitter 3282 to the rotary mirror spinner 324.

The laser beam emitted from the laser diode 322 is reflected through the first reflective mirror 3280, the beam splitter 3282, and the second reflective mirror 3282 in sequence, so as to transmit the laser beam to the reflective surfaces 3240 of the rotary mirror spinner 324, as shown in FIG. 3. And then, the reflective surfaces 3240 reflect the laser beam for transmitting the laser beam to the fixed reflecting mirror assembly 326. Finally, the mirrors 3260 of the fixed reflecting mirror assembly 326 reflect the laser beam, so that the laser beam may project to the 1D barcode for illuminate the 1D barcode.

The 1D barcode may reflect portion laser beam to form the image beam. The image beam is first transmitted to the fixed reflecting mirror assembly 326; the fixed reflecting mirror assembly 326 reflects the image beam for transmitting the image beam to the rotary mirror spinner 324, as shown in FIG. 4. And then, the image beam is reflected through the reflective surfaces 3240 of the rotary mirror spinner 324, the second reflective mirror 3282 in sequence, so as to transmit the image beam to the beam splitter 3282. Finally, the image beam passes through the beam splitter 3282 and the converging lens 322 in sequence, and focuses at the linear sensor 330. The data encoded in the 1D barcode may be decoded by the linear sensor 330 or a decoder electrically connected to the linear sensor 330.

Figure 5:
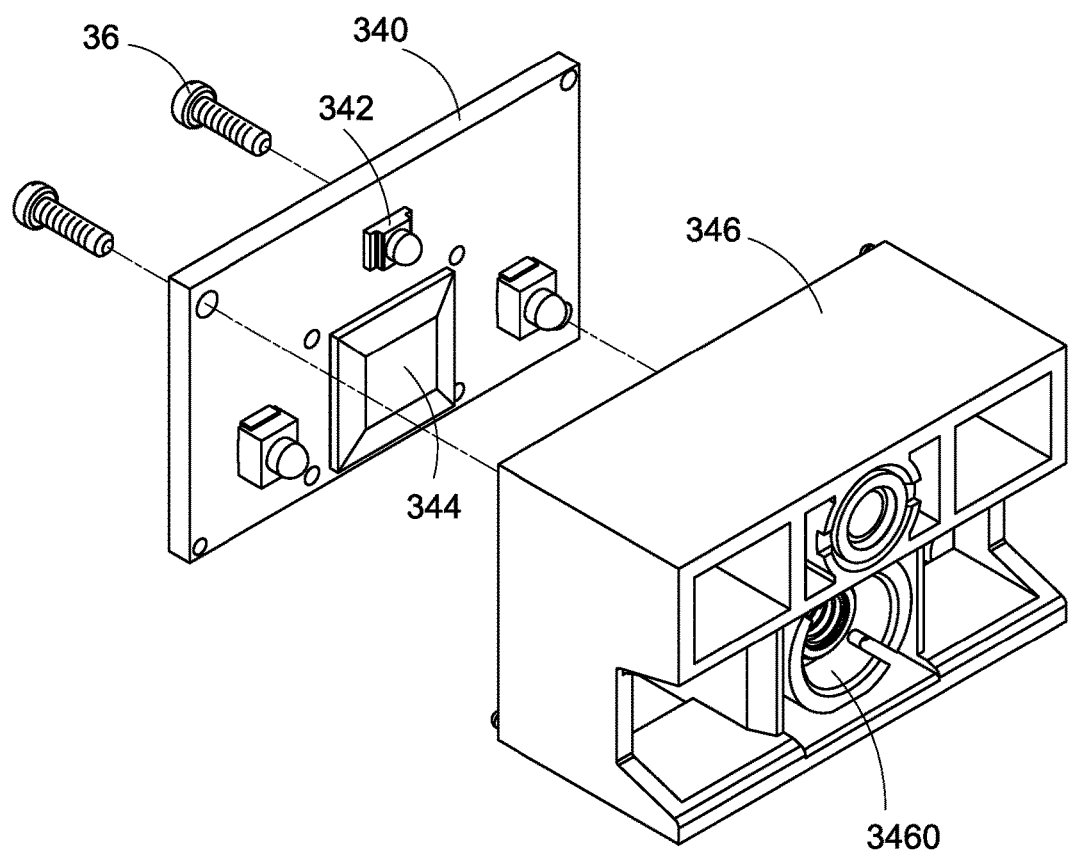
FIG. 5 is a perspective view of a second barcode reading unit in accordance with the 1st embodiment of the present disclosure.

Reference is made to FIG. 5, which is a perspective view of a second barcode reading unit in accordance with the 1st embodiment of the present disclosure. The second barcode reading unit is configured to read (1D and) 2D barcode, such as Quick Response codes (QR codes). In FIG. 5, the second barcode reading unit 34 includes a substrate 340, a plurality of light emitters 342, a surface sensor 344, and a light-confining member 346.

The substrate 340 is, for example, a printed circuit board and circuit foils are placed thereon. The substrate 340 is provided for carrying the light emitters 342, the surface sensor 344, and the light-confining member 346, and transmitting electricity to the light emitters 342 and the surface sensor 344. The substrate 340 is adhered to the carrier board 320 via at least one adhesive member (such as glue or tape); in the practical application, the substrate 340 may be connected to the carrier board 320 by tenon or screw. It should be noted that the carrier board 320 and the substrate 340 may be made by a piece of sheet material, such as a double-sided circuit board for reducing cost. When the carrier board 320 and the substrate 340 are made by a piece of sheet material, the components of the first barcode reading unit 32 and the second barcode reading unit 34 are respectively disposed on two opposite surfaces of the sheet material; more particularly, the components of the first barcode reading unit 32 are disposed on one of the surfaces of the sheet material, and the components of the second barcode reading unit 34 are disposed on the other surface thereof.

With referring to FIG. 5 again; the light emitters 342 and the surface sensor 344 are respectively disposed on the substrate 340, and optical axes of the light emitters 342 and the surface sensor 344 are parallel to the normal of the substrate 340. In this embodiment, the light emitters 342 surround the surface sensor 344 for providing uniform light beam to illuminate the (1D and) 2D barcode. The light emitters 342 may be light emitting diodes (LEDs). The light-confining member 346 disposed on the substrate 340 is disposed between the light emitters 342 and the surface sensor 344, and may be connected to the substrate 340 by a plurality of connecting members 36 (for example, screws). The light-confining member 346 is used to prevent light beam generated by the light emitter 342 from directly entering the surface sensor 344 to affect reading result (such as contrast) of the surface sensor 344.

The second barcode reading unit 34 may further includes a lens 3460 disposed above the surface sensor 344 for focusing image beam provided by the light emitter 342 and reflected by the (1D or) 2D barcode at the surface sensor 344.

With referring to FIG. 1 and FIG. 2 again; the barcode reading device 1 may further includes a first optical-transparent component 13 and a second optical-transparent component 15 for providing dustproof and waterproof functions; the first optical-transparent component 13 is provided for sealing the first window 12, and the second optical-transparent component 15 is provided for sealing the second window 14. The first optical-transparent component 13 and the second optical-transparent component 15 may be filters of specific wavelengths for reducing the effects of ambient light.

The barcode reading device 1 may still further includes a base 18 and a conductive wire 19; the base 18 and the bottom of the polygon housing 10 are pivoted with each other through a hinge 16; the conductive wire 10 is used to transmit data provided by external circuits to the barcode reading module 30. The barcode reading device 1 may yet further includes a buzzer 20 configured to warn the user when the first barcode reading unit 32 or each second barcode reading unit 34 successfully reads barcode. In the embodiment, the buzzer 20 is disposed on one side of the polygon housing where the first window 12 is formed.

The barcode reading device 1 of the present disclosure simultaneously accommodates the first barcode reading unit 32 and the second barcode reading unit 34 in the polygon housing 10; the first barcode reading unit 32 and the second barcode reading unit 34 respectively facing different directions may prevent cables form being tangled, the power consumption and the space occupied by the barcode reading device 1 are also reduced.

In implementation, the barcode reading device 10 may be placed on the checkout station, the first window 12 faces the checkout counter, and the second window 14 faces consumer. The clerk assists by scanning each of 1D barcodes of customer's checkout items with the first barcode reading unit 32, and the consumer may scan one or more of (1D or) 2D barcode of mobile coupons with the second barcode reading unit 34. As such, the mobile device for showing the mobile coupons does not need to be handed over to the clerk for reducing device damage.

Figure 6:
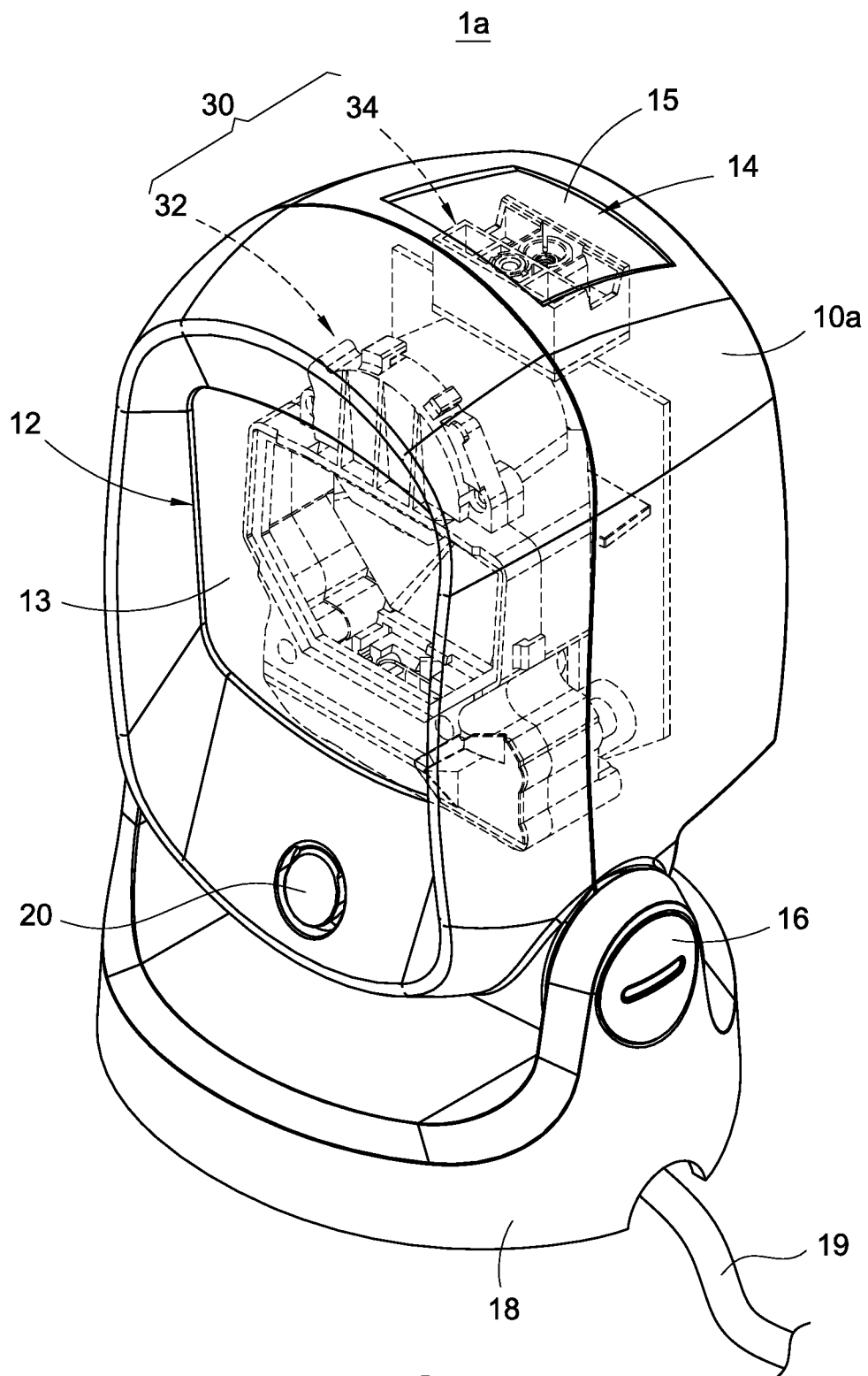
FIG. 6 is a perspective view of a barcode reading device in accordance with a 2nd embodiment of the present disclosure.
Figure 7:
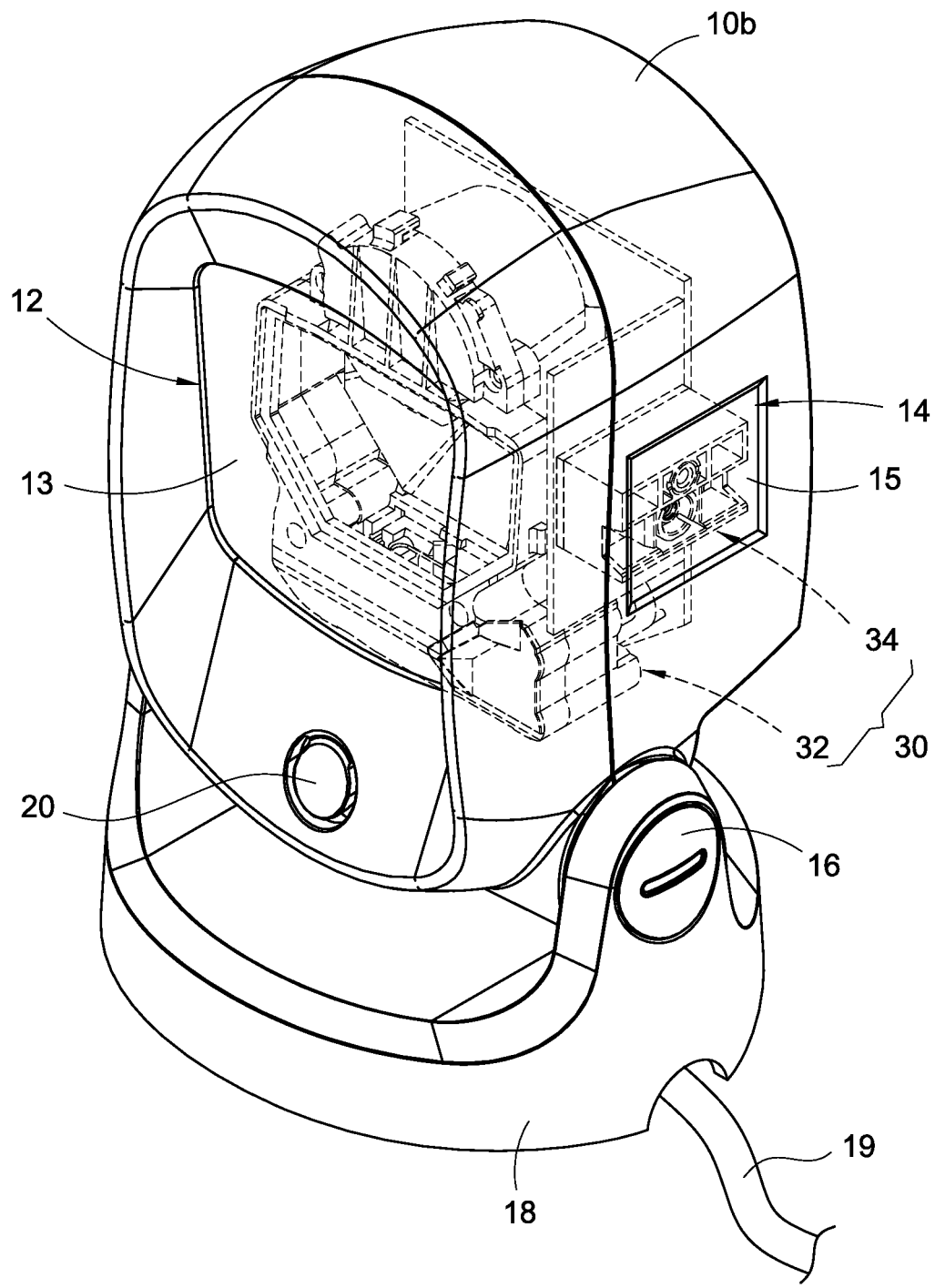
FIG. 7 is a perspective view of a barcode reading device in accordance with a 3rd embodiment of the present disclosure.

FIG. 6 is a perspective views of a barcode reading device in accordance with a 2nd embodiment of the present disclosure, and FIG. 7 is a perspective view of a barcode reading device in accordance with a 3rd embodiment of the present disclosure. The barcode reading device shown in FIG. 6 and FIG. 7 is similar to that shown in FIG. 1 and FIG. 2 mentioned above. The difference is that the first window 12 and the second window 14 of the barcode reading device shown in FIG. 6 and FIG. 7 are formed on two adjacent surfaces of the polygon housing 10a, 10b.

Specifically, in FIG. 6, the second window 14 of the barcode reading device 1a is formed on the top surface of the polygon housing 10a while the first window 12 thereof is formed on the front surface of the polygon housing 10a; the first barcode reading unit 32 is disposed adjacent to the first window 12 for reading 1D barcode, and the second barcode reading unit 34 is disposed adjacent to the second window 14 for reading (1D or) 2D barcode(s). In FIG. 7, the second window 14 of the barcode reading device 1b is formed on the (right) side surface of the polygon housing 10b while the first window 12 thereof is formed on the front surface of the polygon housing 10b; the first barcode reading unit 32 is disposed adjacent to the first window 12 for reading 1D barcode, and the second barcode reading unit 34 is disposed adjacent to the second window 14 for reading (1D or) 2D barcode(s). The function and relative description of other components of the barcode reading devices 1a and 1b respectively shown in FIG. 6 and FIG. 7 are the same as that shown in FIG. 1 and FIG. 2 mentioned above and are not repeated here for brevity, and the barcode reading devices 1a and 1b can achieve the functions as the barcode reading device 1 does.

Figure 8:
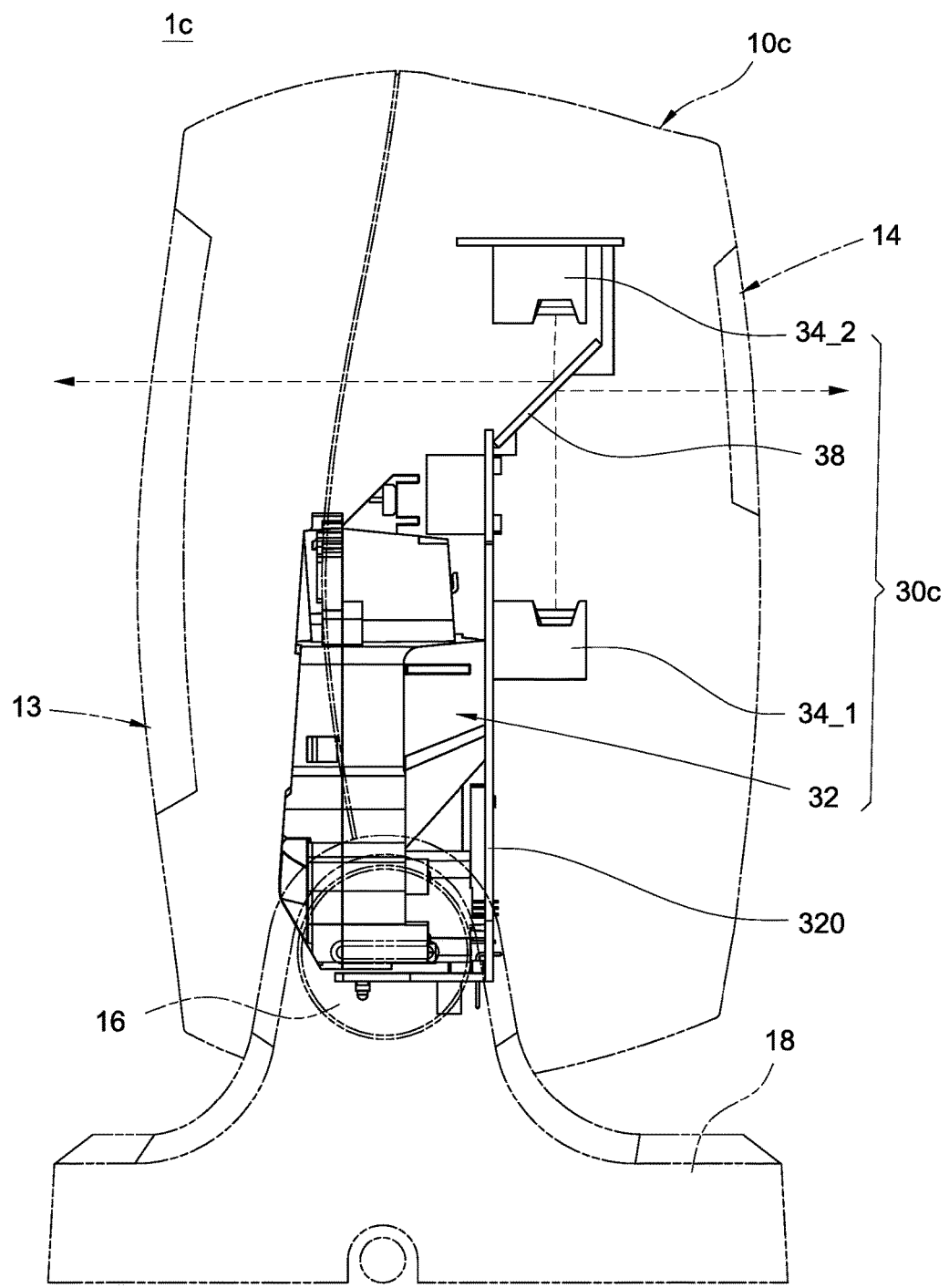
FIG. 8 is a side view of a barcode reading device in accordance with a 4th embodiment of the present disclosure.

FIG. 8 is a side view of a barcode reading device in accordance with a 4th embodiment of the present disclosure. In FIG. 8, the barcode reading device 1c includes a polygon housing 10c and a barcode reading module 30c, the polygon housing 10c formed with an accommodating space, a first window 12, and a second window 14; the first window 12 and the second window 14 communicating with the accommodating space are formed on opposite surfaces of the polygon housing 10c. The barcode reading device 1c may further includes a first optical-transparent component 13 provided for sealing the first window 12 and a second optical-transparent component 15 provided for sealing the second window 14.

The barcode reading module 30 is housed within the polygon housing 10c and includes a first barcode reading unit 32 and two second barcode reading units 34_1 and 34_2, and a double-faced mirror 38. The first barcode reading unit 32 is arranged adjacent to the first window for reading 1D barcode, the second barcode reading unit 34_1 is arranged adjacent to the second window for reading (1D or) 2D1 barcode, and the second barcode reading unit 34_2 is arranged adjacent to the first window for reading (1D or) 2D barcode.

Specifically, the second barcode reading units 34_1 and 34_2 may face each other, and the double-faced mirror 38 is arranged between the second barcode reading units 34_1 and 34_2 and in optical paths thereof for changing transmission path of light beam.

It should be noted that the structure of the first barcode reading unit 32 in this embodiment is the same as that mentioned in the 1st embodiment, and the structure of the second barcode reading units 34_1 and 34_2 are respectively the same as that mentioned in the 1st embodiment.

In FIG. 8, one of the surfaces of the carrier board 320 of the first barcode reading unit 32 is used for carrying the laser diode 322, the rotary mirror spinner 324, the fixed reflecting mirror assembly 326, the light deflecting assembly 328, the linear sensor 330, and the converging lens 332, and the other surface of the carrier board 320 is used for carrying the second barcode reading unit 34_1 and the double-faced mirror 38.

The second barcode reading units 34_1 and 34_2 are respectively includes the substrate 340, the light emitter 342, the surface sensor 344, and the light-confining member 346. The light beam generated from the light emitter 342 of the second barcode reading unit 34_1 is reflected by one of the mirror surface of the double-faced mirror 38; the light beam is then transmitted to the (1D or) 2D barcode through the second optical-transparent component 15. The (1D or) 2D barcode may reflect portion light beam to form the image beam; the image beam passes through the second optical-transparent component 15 and the double-faced mirror 38 in sequence, and focuses at the surface sensor 344. Similarly, the light beam generated from the light emitter 342 of the second barcode reading unit 34_2 is reflected by the other mirror surface of the double-faced mirror 38; the light beam is then transmitted to the (1D or) 2D barcode through the second optical-transparent component 15. The (1D or) 2D barcode may reflect portion light beam to form the image beam; the image beam passes through the first optical-transparent component 13 and the double-faced mirror 38 in sequence, and focuses at the surface sensor 344. The barcode reading device 1c of this embodiment simultaneously accommodates the first barcode reading unit 32 and multiple second barcode reading units 34_1 and 34_2 in the polygon housing 10c; the second barcode reading units 34_1 and 34_2 are respectively facing different directions, such that the use convenience is improved.

Figure 9:
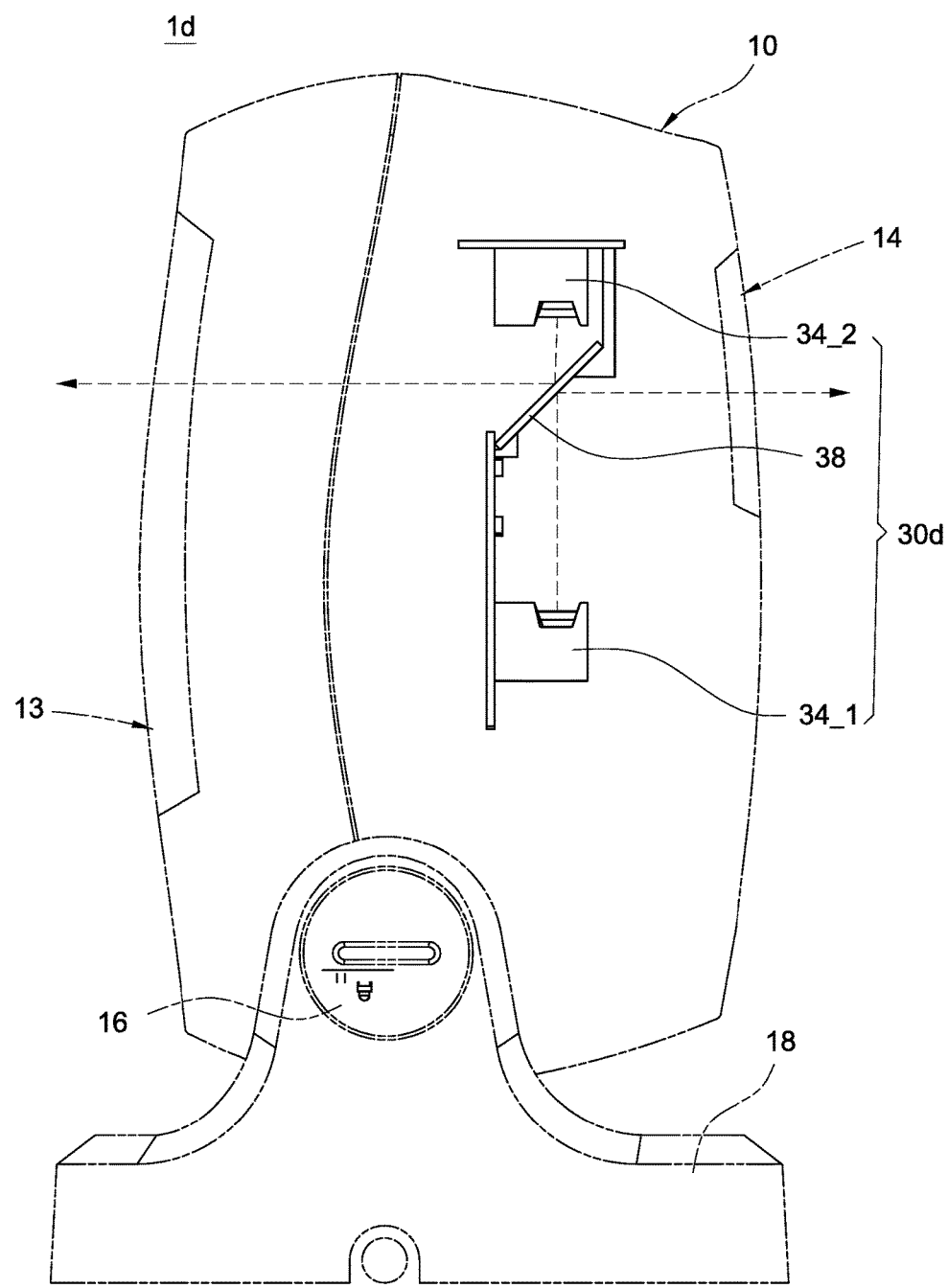
FIG. 9 is a side view of a barcode reading device in accordance with a 5th embodiment of the present disclosure.

FIG. 9 is a side view of a barcode reading device in accordance with a 5th embodiment of the present disclosure. The barcode reading device shown in FIG. 9 is similar to that shown in FIG. 8 mentioned above. The difference is that the barcode reading device 1d shown in FIG. 9 only includes the second barcode reading units 34_1 and 34_2. In the other words, the barcode reading device 1d shown in FIG. 9 does not include the first barcode unit.

Specifically, the barcode reading device 1d shown in FIG. 9 includes a polygon housing 10 and a barcode reading module 30d, and the barcode reading module 30d includes two second barcode reading units 34_1 and 34_2 and a double-faced mirror 38. The barcode reading module 30 is housed within the polygon housing 10, one of the second barcode reading units 34_1 faces one mirror surface of the double-faced mirror 38, and the other second barcode reading units 34_2 faces the other mirror surface of the double-faced mirror 38. In the other words, the double-faced mirror 38 is arranged in optical paths of the second barcode reading units 34_1 and 34_2. The second barcode reading units 34_2 of the barcode reading device 30d reads (1D or) 2D barcode through the second window 14 sealing with the second optical-transparent component, and the other second barcode reading units 34 reads (1D or) 2D barcode through the first window sealing with the first optical-transparent component 13. It should be noted that the structure of the structure of the second barcode reading units 34_1 and 34_2 are respectively the same as that mentioned in the 1st embodiment. The barcode reading device 1d of this embodiment simultaneously accommodates multiple second barcode reading units 34_1 and 34_2 in the polygon housing 10; the second barcode reading units 34_1 and 34_2 are respectively facing different directions, such that the use convenience is improved.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the disclosure as defined in the appended claims.

What is claimed is:

1. A barcode reading device (1, 1a, 1b, 1c, 1d) comprising:
    a polygon housing (10, 10a, 10b) formed with an accommodating space, a first window (12), and a second window (14), wherein the first window (12) is formed on one of the surfaces of the polygon housing (10, 10a, 10b), and the second window (14) is formed on another surface of the polygon housing (10, 10a, 10b); and
    a plurality of barcode reading units (32, 34, 34_1, 34_2) housed within the accommodating space of the polygon housing (10, 10a, 10b),
    wherein one of the barcode reading units (32, 34, 34_1, 34_2) reads barcode through the second window (14), and the other barcode reading units (32, 34, 34_1, 34_2) read barcode through the first window (12);
    wherein the first window (12) and the second window (14) are formed at two opposite surfaces of the polygon-housing (10, 10a, 10b);
    wherein the barcode reading units (32, 34, 34_1, 34_2) comprises a first barcode reading unit (32) and two second barcode reading units (34, 34_1, 34_2), the first barcode reading unit (32) and one of the second barcode reading units (34, 34_1, 34_2) read barcode through the first window (12), and the other second barcode reading unit (34, 34_1, 34_2) reads barcode through the second window (14);
    wherein the first barcode reading unit (32) comprises:
    a linear sensor (330);
    a laser diode (322) for generating a laser beam;
    a rotary mirror spinner (324) rotating in a predetermined direction; and
    a fixed reflecting mirror assembly (326) arranged in a U-shaped manner and having an opening (3262) toward the rotary mirror spinner (324), the rotary mirror spinner (324) and the fixed reflecting mirror assembly (326) collectively transmit the laser beam to a one-dimensional barcode and an image beam reflected by the one-dimensional barcode to the linear sensor (330);
    each second barcode reading unit (34, 34_1, 34_2) comprises:
    a surface sensor (344);
    a plurality of light emitters (342) surrounding the surface sensor (344), wherein an optical axis of the surface sensor (344) is parallel to optical axes of the light emitters (342); and
    a light-confining member (346) disposed between the surface sensor (344) and the light emitters (342) for prevent light beam generated by the light emitters (342) from directly entering the surface sensor (344), the light emitters (342) are provided for generating light beam to illuminate the one-dimensional barcode or a two-dimensional barcode, and an image beam reflected by the one-dimensional barcode or the two-dimensional barcode is then transmitted to the surface sensor (344).

2. The barcode reading device (1, 1a, 1b, 1c, 1d) of claim 1, wherein the first barcode reading unit (32) reads the one-dimensional barcode through the first window (12), and the second barcode reading unit (34) reads the one-dimensional barcode or the two-dimensional barcode through the second window (14).

3. The barcode reading device (1, 1a, 1b, 1c, 1d) of claim 1, wherein one of the second barcode reading unit (34, 34_1, 34_2) read the one-dimensional barcode or the two-dimensional barcode through the first window (12), and the other second barcode reading unit (34, 34_1, 34_2) reads the one-dimensional barcode or the two-dimensional barcode through the second window (14).

4. The barcode reading device (1, 1a, 1b, 1c, 1d) of claim 3, further comprising a double-sided mirror (38) housed within the accommodating space, one of the second barcode reading units (34, 34_1, 34_2) faces one mirror surface of the double-sided mirror (38), and the other second barcode reading unit (34, 34_1, 34_2) faces the other mirror surface of the double-sided mirror (38).

5. The barcode reading device (1, 1a, 1b, 1c, 1d) of claim 1, further comprising a double-faced mirror (38) housed within a chamber, the first barcode reading unit (32) and one of the second barcode reading units (34, 34_1, 34_2) face one mirror surface of the double-faced mirror (38), and the other second barcode reading unit (34, 34_1, 34_2) faces the other mirror surface of the double-faced mirror (38).

6. The barcode reading device (1, 1*a*, 1*b*, 1*c*, 1*d*) of claim 1, wherein the first barcode reading unit further comprises:
- a carrier board (320) provided for carrying the laser diode (322), the linear sensor (330), the rotary mirror spinner (324), and the fixed reflecting mirror assembly (326);
- a beam splitter (3282) disposed above the linear sensor (330);
- a first reflective mirror (3280) disposed above the laser diode (322); and
- a second reflective mirror (3284) disposed above the beam splitter (3282),
- wherein the laser beam provided by the laser diode (322) is reflected through the first reflective mirror (3280), the beam splitter (3282), the second reflective mirror (3284), the rotary mirror spinner (324), and the fixed reflecting mirror assembly (326) in sequence for illuminating the one-dimensional barcode, and the image beam is reflected through the fixed reflecting mirror assembly (326), the rotary mirror spinner (324), and the second reflective mirror (3284) in sequence, and then transmitted to the linear sensor (330) through the beam splitter (3282).

7. The barcode reading device (1, 1*a*, 1*b*, 1*c*, 1*d*) of claim 6, further comprising a converging lens (332) arranged between the light splitter (3282) and the linear sensor (330) for focusing the image beam to the linear sensor (330).

8. The barcode reading device (1, 1*a*, 1*b*, 1*c*, 1*d*) of claim 1, wherein the second barcode reading unit (34, 34_1, 34_2) further comprises a lens (3460) disposed above the surface sensor (344), the light emitters (342) are provided for illuminating the barcode, and the lens (3460) is provided for focusing image beam reflected by the barcode at the surface sensor (344).

9. The barcode reading device (1, 1*a*, 1*b*, 1*c*, 1*d*) of claim 8, wherein each second barcode reading unit (34, 34_1, 34_2) further comprises:
- a substrate (340) provided for carrying the light emitters (342) and the surface sensor (344); and
- a plurality of connecting members (36) providing for connecting the light-confining member (346) with the substrate (340).

10. The barcode reading device (1, 1*a*, 1*b*, 1*c*, 1*d*) of claim 1, further comprising:
- a first optical-transparent component (13) provided for sealing the first window (12); and
- a second optical-transparent component (15) provided for sealing the second window (14).

11. The barcode reading device (1, 1*a*, 1*b*, 1*c*, 1*d*) of claim 1, further comprising:
- a base (18) pivoted with the polygon housing (10, 10*a*, 10*b*); and
- a buzzer (20) disposed on the polygon housing (10, 10*a*, 10*b*) and configured to warn when the first barcode reading unit (32) or each second barcode reading unit (34, 34_1, 34_2) successfully reads barcode.

* * * * *